No. 653,852. Patented July 17, 1900.
C. H. SMITH.
NUT.
(Application filed Apr. 11, 1900.)

(No Model.)

Witnesses:
J. Sovereign.
E. Behel.

Inventor
Charles H. Smith
By A. O. Behel
Atty.

UNITED STATES PATENT OFFICE.

CHARLES H. SMITH, OF OWATONNA, MINNESOTA, ASSIGNOR OF TWO-THIRDS TO ROSS M. VICKERS, OF SAME PLACE, AND CHARLES RYSTROM, OF ROCKFORD, ILLINOIS.

NUT.

SPECIFICATION forming part of Letters Patent No. 653,852, dated July 17, 1900.

Application filed April 11, 1900. Serial No. 12,404. (No model.)

*To all whom it may concern:*

Be it known that I, CHARLES H. SMITH, a citizen of the United States, residing at Owatonna, in the county of Steele and State of Minnesota, have invented certain new and useful Improvements in Nuts, of which the following is a specification.

The object of this invention is to construct a nut of coiled material which is internally screw-threaded and when placed upon a bolt or screw-threaded shank will exert a pressure in the lengthwise direction of the bolt or shank, which will act as a lock-nut and prevent it from unturning until the lengthwise pressure is removed.

Figure 1:
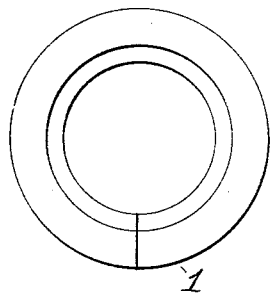
Figure 2:
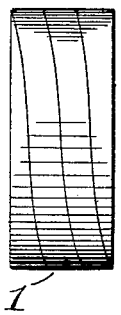
Figure 3:
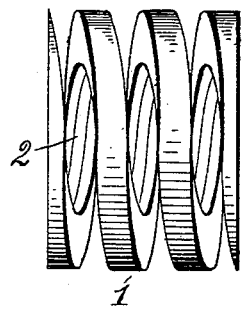
Figure 4:
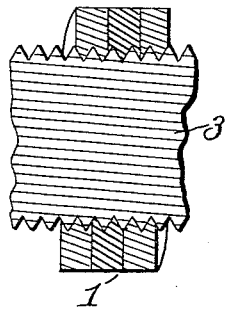
Figure 5:
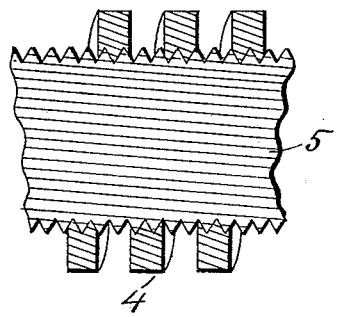

In the accompanying drawings, Figure 1 is an end view of my improved coiled nut. Fig. 2 is a face view of the same in its compressed position. Fig. 3 is a face view of the nut in its expanded position. Fig. 4 is a lengthwise section of the bolt with my improved nut in place. Fig. 5 is a lengthwise section of the bolt, showing the application of a modification of my improvements.

The nut shown in the accompanying drawings is made from material coiled and internally screw-threaded and the construction shown at Fig. 2 consists of the coiled nut having its coils 1 closely pressed together and held in this position while the screw-threads 2 are being cut. Fig. 3 shows the condition of the coils after they are liberated and in their normal condition, and in placing this nut upon the bolt 3 or other screw-threaded shaft the coils are held compressed, and when liberated the pressure of the coils is in the lengthwise direction of the bolt and seeking to separate, which will be sufficient to prevent its unwinding by the application of external devices until the pressure is relieved.

At Fig. 5 is shown a section of a bolt and the application of my improved nut in which the lengthwise pressure of the coils is opposite to that shown in the other figures. In this construction of nut the coils 4 are closely wound and held separated while being screw-threaded, and are thus held while the nut is placed on the bolt 5, and when liberated the tendency of the coils is to contract, producing lengthwise pressure upon the threads of the bolt, preventing it from unwinding until the pressure is removed.

My improved nut is especially adapted for railway and bridge construction.

The devices for placing the nuts on the bolts will form the subject-matter for other applications.

It is evident that the outward appearance of my improved nut may be of a square or other form without departing from the scope of my invention.

With the nut in the position upon the bolt shown at Fig. 4 in addition to the lengthwise pressure of the threads of the coils of the nut upon the threads of the bolt there is also a pressure at right angles thereto, as the coils of the nut are seeking to attain their normal extended position wherein the threaded opening is smaller than when placed upon the bolt.

In the construction shown at Fig. 5 the nut is held by the lengthwise pressure of the threads of its coils upon the threads of the bolt.

I claim as my invention—

1. A nut composed of a series of coils of spring material having a threaded opening, the threads of which lie in the same plane with and exceed in diameter the threads of a coöperating bolt when the coils have been sprung into a position to be placed upon said bolt, but when released thereon are adapted to exert pressure against the threads of the bolt.

2. A nut composed of a series of coils of spring material having a threaded opening, the threads of which lie in the same plane with and exceed in diameter the threads of a coöperating bolt when the coils have been sprung into a position to be placed upon said bolt, but when released thereon are adapted to exert lengthwise pressure against and also contract upon the threads of the bolt.

CHARLES H. SMITH.

Witnesses:
J. W. ROWLAND,
GUY W. DOOLITTLE.